United States Patent [19]
Eisenhardt et al.

[11] Patent Number: 5,117,288
[45] Date of Patent: May 26, 1992

[54] METHOD OF DECODING CODED IMAGE DATA UTILIZING TRANSMISSION ERROR DETECTION TO INTERRUPT DECODING AND UP-DATING

[75] Inventors: Volker Eisenhardt, Ulm; Georg Kummerfeldt, Neu-Ulm; Franz May; Winfried Wolf, both of Ulm, all of Fed. Rep. of Germany

[73] Assignee: Licentia Patent-verwaltungs-GmbH, Frankfurt am Main, Fed. Rep. of Germany

[21] Appl. No.: 618,566

[22] Filed: Nov. 27, 1990

[30] Foreign Application Priority Data

Nov. 27, 1989 [DE] Fed. Rep. of Germany ....... 3939136

[51] Int. Cl.$^5$ ............................................. H04N 7/13
[52] U.S. Cl. ..................................... 358/136; 358/135
[58] Field of Search ...................... 358/135, 136, 133; 371/55, 30, 31, 32, 34

[56] References Cited

U.S. PATENT DOCUMENTS

| | | | |
|---|---|---|---|
| 4,677,480 | 6/1987 | Kuroda et al. | 358/136 |
| 4,827,340 | 5/1989 | Pirsch | 358/136 |
| 4,876,595 | 10/1989 | Veldhius | 358/136 |
| 4,989,089 | 1/1991 | Chantelou et al. | 358/136 |

Primary Examiner—Victor R. Kostak
Attorney, Agent, or Firm—Spencer, Frank & Schneider

[57] ABSTRACT

A method of decoding coded image data, preferably coded according to CCITT Recommendsation H. 261, wherein the data stream is continuously monitored for transmission errors by utilizing the residual redundancy of the data stream, and pixel values reconstructed after the detection of a transmission error are not entered into the predicted-image memory until a subsequent starting code word for a frame or field has appeared.

18 Claims, 2 Drawing Sheets

METHOD OF DECODING CODED IMAGE DATA UTILIZING TRANSMISSION ERROR DETECTION TO INTERRUPT DECODING AND UP-DATING

REFERENCE TO RELATED APPLICATIONS

This application claims the priority of Federal Republic of Germany application Serial No. P 39 39 136.1 filed Nov. 27th, 1989, which is incorporated herein by reference.

BACKGROUND OF THE INVENTION

The present invention relates to a method of decoding coded image data from a data stream, particularly for the transmission of sequences of moving images, and for bringing the contents of a predicted-image memory up to date on the basis of the pixel values obtained from the decoding, wherein the image data are coded according to a coding method employing residual redundancy and the data stream includes unequivocally associatable starting code words for the frame and/or fields.

The digital transmission of sequences of moving images by pixel-by-pixel coding and transmitting the original images requires bit rates which cannot be approximately reached in an economical manner in networks involving a large number of users, such as, for example, the ISDN of the German Federal Postal Service. Therefore, efficient coding methods have been developed for television signals in order to transmit or store image sequences. These coding methods utilize redundancies from frame to frame to reduce the data rate and the data quantity required for the reconstruction of moving images. These methods become even more efficient if motion compensation is additionally employed. For example, at the meeting of the CCITT (International Telegraph and Telephone Consultative Committee) Study Group XV, Working Party XV/1, Specialists Group on Coding for Visual Telephony, held Nov. 7-10, 1989, in Tokyo, Japan, a standard for the transmission of images was issued as Document 584, bearing the CCITT Recommendation No. H. 261. The Decision by Study Group XV was expected in March of 1990.

In the coding method according to the cited CCITT recommendation, or in similar methods, the redundancy contained in the sequence or succession of original frames is reduced considerably in that essentially only changes in the original frame are being transmitted. A predicted-image memory is provided for the reconstruction of the sequence of moving images, with the content of the memory covering a complete frame, and the memory is brought up to date by means of pixel values reconstructed at the receiving end from the transmitted and decoded data.

The data reduction has the result that transmission errors lead to noticeable image interference in the decoder. The reason for this is that a bit error generally leads to a chain of improperly decoded pixels and, on the basis of frame-to-frame prediction, an error is visible not only for a brief moment but for a longer period of time.

To prevent this type error as much as possible, conventional data reduction methods for image sequences operate with error, protection and error correction for individual bit errors or short error bundles. In order to reduce in the course of time an error that has already occurred, frame-to-frame prediction is also interrupted periodically in small image regions and the original content is transmitted in coded form.

Error correction systems fail, among others, if there are long error bundles and particularly in packet or ATM networks when a whole packet or one or more cells are lost. Although the periodic transmission of original information gradually reduces errors, it cannot prevent its annoying visibility.

SUMMARY OF THE INVENTION

It is an object of the present invention to substantially avoid image interference of the above-described type.

The above object is generally achieved according to the present invention by a method for decoding and utilizing coded image data from a received data stream, particularly for the transmission of sequences of moving images, wherein the image data are coded according to a coding method employing residual redundancy and the data stream includes unequivocally associatable starting code words for a frame or fields, and with the method including the steps of: decoding the image data to provide reconstructed pixel values; bringing the contents of a predicted-image memory up to date on the basis of the reconstructed pixel values obtained from the decoding; following detection of one of said starting code words, constantly checking the data stream, utilizing said residual redundancy, for the occurrence of a transmission error; and, upon the detection of a transmission error, interrupting the up-dating of the memory, and no longer utilizing the reconstructed pixel values to bring the predicted-image memory up to date, until a new starting code word appears for the frame or field.

According to the preferred embodiment of the invention the residual redundancy of the coding method is such that not all bit sequences are permissible, and the step of constantly checking includes carrying out a continuous check during the decoding to determine whether a decoded signal has left the permissible paths of a decoding tree, and detecting a transmission error if the decoded signal has left the permissible paths of the decoding tree.

According to a further feature of the invention error reports from other components of a receiver may be utilized to indicate the occurrence of a transmission error and to stop the utilization of reconstructed pixel values for bringing the predicted-image memory content up to date until the occurrence of a new starting code word for the frame or field.

According to still a further feature of the invention, after detection of a transmission error, pixel values reconstructed before the detection of the error for a given time period are also excluded from being used to bring the predicted-image memory content up to date.

DETAILED DESCRIPTION OF THE PREFERRED EMBODIMENTS

Figure 1:
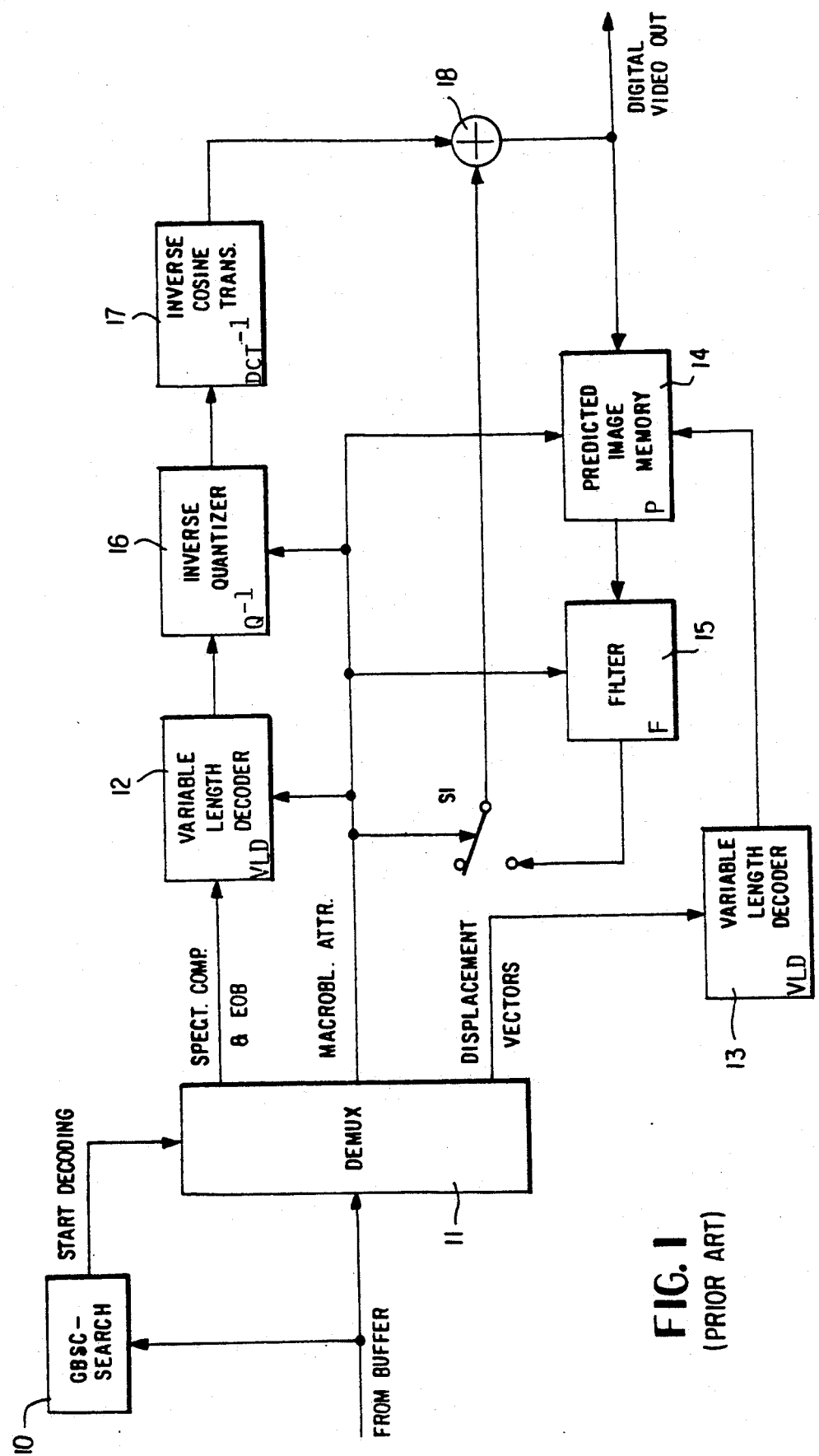
FIG. 1 is a simplified block diagram of an embodiment of a decoder according to the prior art.

The invention will now be described in greater detail with reference to the cited CCITT Recommendation H. 261, (the subject matter of which is incorporated by reference) as an example.

Modern coding methods customarily have a hierarchical structure. In CCITT Recommendation H. 261, for example, the frame is divided into 3 or 12 fields or groups of blocks (Go B) (depending on the resolution) and these fields are again each divided into 33 macro blocks which are then each divided into six blocks of 8*8 pixels each. There is a starting code word for the frame and for each one of the fields. Then, frame and field attributes are transmitted, followed by the macro block attributes and finally the data of the block addressed by the attributes. The transmission of these attributes is not free of redundancy. This is expressed, for example in that the decoding tree contains bit combinations that are not permitted. However, a bit error occurring in the data stream or missing bits (due to the loss of a packet or cell) do not inevitably result in an improper bit combination. That is, a bit error may also simulate other proper bit combinations and, particularly if optimum codes including different word lengths are employed, may lead to serious interference in the decoding of the subsequent bits. For the present invention, the realization is significant that in spite of it being possible for an error to produce a false but permissible bit combination, the decoding of the subsequent bits with high probability produces an improper bit combination due to the residual redundancy of the coding method, that is, the permissible paths of the decoding tree are not followed.

According to the present invention, the data stream is therefore checked, by utilizing the residual redundancy, for the occurrence of transmission errors, with preferably the state of an improper bit combination being evaluated as a sign of a transmission error.

The report from another error detecting component in the receiver, for example, the forward error corrector (BCH decoder) in the decoder may also be utilized to detect a transmission error. In any case, after an error in the data stream has been detected, the subsequent bits of the data stream and the pixel values reconstructed therefrom after decoding, are no longer utilized to bring the predicted-image memory up to date. Therefore, the memory contents remains unchanged for the image regions in question. The data stream is checked further for the occurrence of a code word from a small number of code words having a fixed association. In recommendation H. 261 these are the starting code words for a frame or for one of the numbered fields (also the frame or field sync pulse). When such a starting code word has been received and decoded correctly, a defined state exists and the synchronization for the decoding process is re-established so that the subsequent bits are again decoded correctly and the pixel values reconstructed therefrom can be entered into the predicted-image memory again. Therefore, transmission errors do not lead to noticeable interference in the image, but only to a delayed up-dating of a generally relatively small section of the image.

Moreover, interferences remaining according to the above-described measures which are caused by the decoding of the data stream between the occurrence and detection of a transmission error can be further reduced in that the reconstructed pixel values are not entered into the predicted-image memory immediately, but rather with a predetermined delay and that, once a transmission error has been detected, already decoded image data or reconstructed pixel values are retroactively not utilized, to a predetermined extent, to bring the predicted-image memory up to date. With coding according to recommendation H. 261, this non-utilization preferably employs all already decoded values of the momentary macro block and selectively additionally of the values of the last preceding block or macro block.

In addition to the occurrence of improper bit combinations during decoding, error reports may preferably also be derived according to the following criteria:

(a) if a decoded and dequantized spectral component lies outside of a permitted amplitude range for spectral components; and/or (b) if an improperly high macro block number occurs; and/or (c) if shift vectors point toward pixels outside the coded image region; and/or (d) if more than a given maximum number of spectral components are decoded in a block.

These criteria represent special cases for improper situations as they are also defined, for example, by the cited Recommendation H. 261 where they are limited to, for example, a highest macro block number of 33 or a maximum of 64 spectral components in one block.

The present invention is not limited to the described examples. In particular, other coding methods similar to H. 261 may be provided. The invention can also be employed in an advantageous manner in image storage systems which, in order to save memory space, operate with data reduction methods.

FIG. 1 shows a simplified block diagram of a common decoder for data streams from a predictive frame to frame encoder using motion compensation and block quantization of the prediction error with discrete cosine transform and variable length coding of quantized spectral components. The normal decoding procedure, explained for a decoder for a data stream according to Recommendation H.261 is as follows:

According to H.261, the picture is subdivided in 12 (full resolution) or 3 (quarter resolution) Group of Blocks consisting of 33 Macroblocks, each consisting of 6 Blocks. The incoming data stream is supervised in order to detect start codewords formed by special bit patterns which are normally forbidden in the data stream. In the case of H.261 decoding, these codewords are the Picture Start Code (PSC) and the Group of Block Start Code (GBSC). After detection of a GBSC by the GBSC search circuit or detector 10, the decoding procedure starts. The incoming data stream is demultiplexed in the demultiplexer (DEMUX) 11 and different data types are as indicated separated. The most important data type are: Macroblock Attributes comprising the quantizer stepsize, intra/interframe decision, moved/unmoved decision and loop filter switch; the Macroblock Information comprising the displacement vectors; and (blockwise) the encoded spectral components and end of block markers (EOB). The transmitted spectral components and the displacement vectors have been encoded using variable length code tables, and the inverse operations are performed in the respective (Variable Length Decoders (VLD) 12 and 13). The Predictor (P) 14 is a frame store out of which the estimation for the actual picture is calculated using the transmitted and decoded displacement vectors, while the block 15 is a filter (F) whose use is signalled by the macroblock attributes. The inverse quantization of the output from VLD 12 is performed in the inverse quantizer ($Q^{-1}$) 16 whose output is fed to the circuit 17 ($DCT^{-1}$) which performs the inverse Cosine Transform. The decoded prediction error from $DCT^{-1}$ 17 is then added via an adder 18 to the estimated picture provided via the output of filter 15 and switch S1 (when closed), or, in the case of intraframe encoding, is added to zero (no frame to frame prediction). The digital output of adder 18 is then fed to the predictor 14 to up-date same and to the video output for display.

Figure 2:
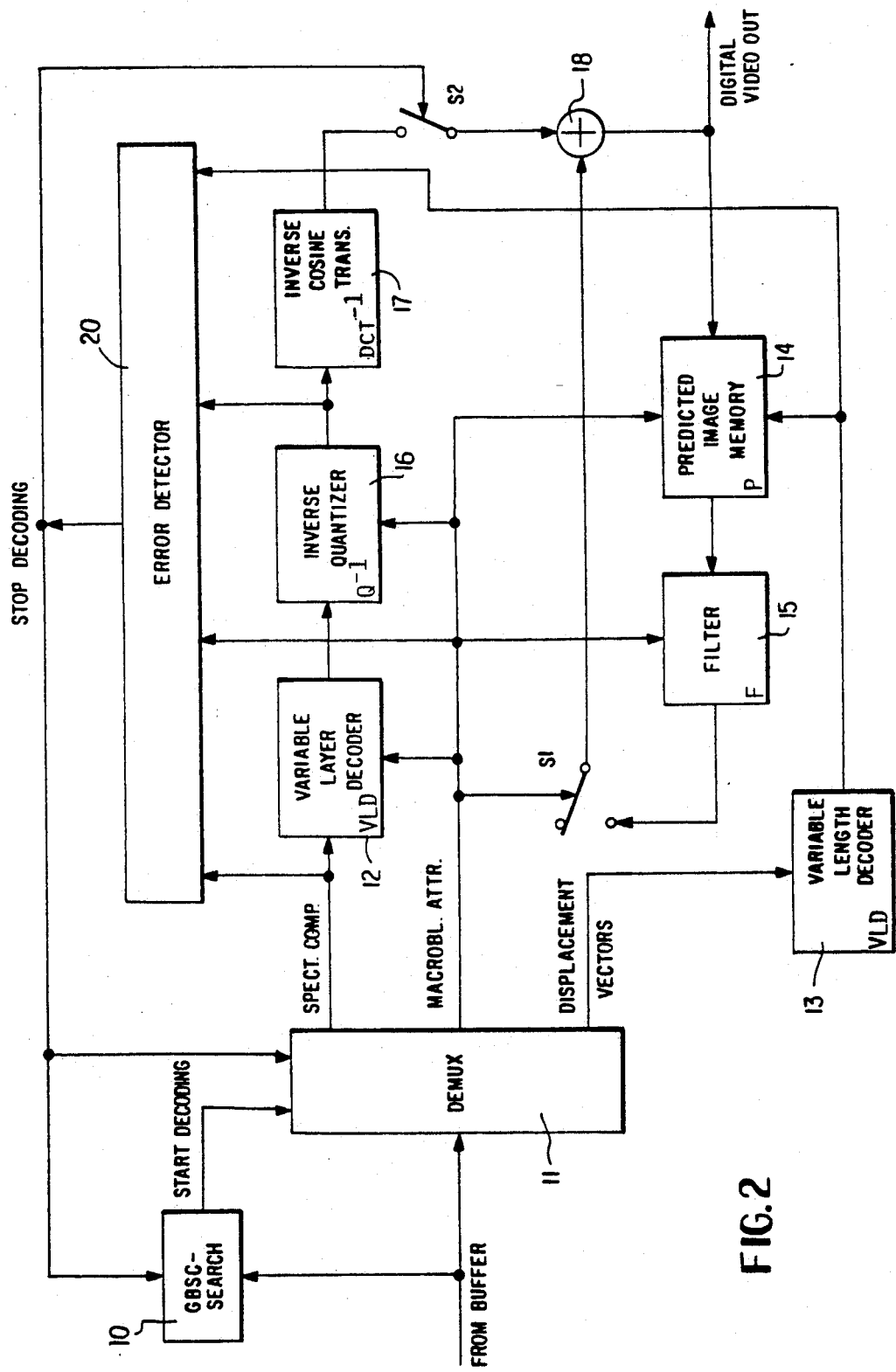
FIG. 2 is a simplified block diagram showing a modification of the decoder of FIG. 1 for carrying out the method according to the invention.

FIG. 2 shows, in principle, the operation of the method according to the invention. As shown an Error Detector 20 supervises the Macroblock Attributes, the dequantized spectral components, the displacement vectors and the EOB-markers, and checks to see if their respective values are in accordance with the agreed decoding procedure (examples of which are mentioned above). If an error is detected, the decoding procedure is stopped (the switch S2 is opened, as shown while switch S1 is closed) and no more data are added to the predicted picture content until the GBSC SEARCH 10 starts the decoding procedure again. This procedure protects the reconstructed picture from being disturbed by annoying data produced by erroneous decoding after transmission errors or lost transmission packets (cells).

The invention now being fully described, it will be apparent to one of ordinary skill in the art that any changes and modifications can be made thereto without departing from the spirit or scope of the invention as set forth herein.

What is claimed is:

1. In a method for decoding and utilizing coded image data from a received data stream, particularly for the transmission of sequences of moving images, wherein the image date are coded according to a coding method employing residual redundancy and the data stream includes unequivocally associatable starting code words for a frame or fields, said method including the steps of decoding the image data to provide reconstructed pixel values, and up-dating the contents of a predicted-image memory on the basis of the reconstructed pixel values obtained form said step of decoding; the improvement comprising: following detection of one of said starting code words, constantly checking said data stream, utilizing said residual redundancy of said image data, for the occurrence of a transmission error; and, upon the detection of a transmission error, interrupting said step of up-dating, and no longer utilizing said reconstructed pixel values to bring the predicted-image memory up to date, until a new starting code word appears for the frame or field.

2. A method as defined in claim 1, wherein the residual redundancy of the coding method is such that not all bit sequences are permissible; and said step of constantly checking includes carrying out a continuous check during said step of decoding to determine whether a decoded signal has left permissible paths of a decoding tree, and detecting a transmission error if the decoded signal has left permissible paths of the decoding tree.

3. A method as defined in claim 2, further comprising utilizing error reports from other components of a receiver to additionally indicate the occurrence of a transmission error and to stop the utilization of reconstructed pixel values for bringing the predicted-image memory content up to date until the occurrence of a new starting code word for the frame or field.

4. A method as defined in claim 3, further comprising: after detection of a transmission error, excluding pixel values reconstructed before said detection of said error for a given time period from being utilized for up-dating the predicted-image memory content.

5. A method as defined in claim 2, further comprising: after detection of a transmission error, excluding pixel values reconstructed before said detection of said error for a given time period from being utilized for up-dating the predicted-image memory content.

6. A method as defined in claim 1, further comprising utilizing error reports from other components of a receiver to additionally indicate the occurrence of a transmission error and to stop the utilization of reconstructed pixel values for bringing the predicted-image memory content up to date until the occurrence of a new starting code word for the frame or field.

7. A method as defined in claim 6, further comprising: after detection of a transmission error, excluding pixel values reconstructed before said detection of said error for a given time period from being utilized for up-dating the predicted-image memory content.

8. A method as defined in claim 7, wherein said image data are coded according to CCITT Recommendation H. 261 in which each frame is subdivided into a number of fields which are in turn subdivided into a plurality of macro-blocks which are divided into six blocks each containing 8×8 pixels.

9. A method as defined in claim 8, wherein, after detection of a transmission error, all already reconstructed pixel values of the momentary macro block and also pixel values of the last preceding block or macro block are additionally not utilized to bring the predicted-image memory up to date.

10. A method as defined in claim 6, wherein a transmission error is determined to have occurred if a decoded and dequantized spectral component lies outside of a permissible amplitude range for spectral components.

11. A method as defined in claim 6, wherein each field is divided into a given number of macro-blocks and a transmission error is determined to have occurred if an unduly high macro block number appears.

12. A method as defined in claim 6, wherein a transmission error is determined to have occurred if shift vectors point to pixels outside of the coded image region.

13. A method as defined in claim 6, wherein each field is divided into a number of macro-blocks each of which in turn is subdivided into a plurality of blocks with a given number of pixels, and a transmission error is determined to have occurred if more than a given maximum number of spectral components are decoded in a block.

14. In a method for decoding and utilizing coded image data from a received data stream, particularly for the transmission of sequences of moving images, wherein the image data are coded according to a coding method employing residual redundancy and the data stream includes unequivocally associatable starting code words for a frame or fields, said method including the steps of decoding the image data to provide reconstructed pixel values, adding the reconstructed pixel values obtained from said step of decoding to the output of a predicted-image memory to provide a digital video signal, and up-dating the contents of the predicted image memory with the digital video signal; the improvement comprising: following detection of one of said starting code words, continuously checking said data stream, utilizing said residual redundancy of said image data, for the occurrence of a transmission error; and, upon the detection of a said transmission error, immediately interrupting said steps of adding and up-dating until a new starting code word is detected for a frame or field.

15. A method as defined in claim 14, wherein the residual redundancy of the coding method is such that not all bit sequences are permissible; and said step of checking includes carrying out a continuous check during said step of decoding to determine whether a decoded signal has left permissible paths of a decoding tree, and detecting a transmission error if the decoded signal has left permissible paths of the decoding tree.

16. A method as defined in claim 14, wherein said occurrence of a transmission error is detected if a decoded and dequantized spectral component has a value outside of a permissible amplitude value range for spectral components.

17. A method as defined in claim 14, wherein said occurrence of a transmission error is detected if decoded shift vectors point to pixels outside of the coded image region being evaluated.

18. A method as defined in claim 14, wherein each field is divided into a number of blocks each having a given number of pixels, and said occurrence of a transmission error is detected if the number of spectral components decoded in a block is greater than said given number of pixels.

* * * * *